(12) United States Patent
Park et al.

(10) Patent No.: US 8,737,790 B2
(45) Date of Patent: May 27, 2014

(54) JUNCTION STRUCTURE FOR WAVE PROPAGATION, WAVE DIODE AND WAVE HALF-ADDER USING THE SAME

(75) Inventors: Namkyoo Park, Seoul (KR); Sunkyu Yu, Seoul (KR); Xianji Piao, Seoul (KR); Sukmo Koo, Goyang-si (KR)

(73) Assignee: Seoul University R & DB Foundation, Seoul (KR)

( * ) Notice: Subject to any disclaimer, the term of this patent is extended or adjusted under 35 U.S.C. 154(b) by 50 days.

(21) Appl. No.: 13/534,380

(22) Filed: Jun. 27, 2012

(65) Prior Publication Data
US 2012/0326804 A1 Dec. 27, 2012

(30) Foreign Application Priority Data
Jun. 27, 2011 (KR) ........................ 10-2011-0062267

(51) Int. Cl.
  *G02B 6/00* (2006.01)
  *G02B 6/024* (2006.01)
  *G02F 1/365* (2006.01)
(52) U.S. Cl.
  CPC *G02B 6/00* (2013.01); *G02B 6/024* (2013.01); *G02F 1/365* (2013.01)
  USPC ........................................ 385/122

(58) Field of Classification Search
  CPC .......... G02B 6/00; G02B 6/024; G02F 1/365
  USPC .................................. 385/122–129
  See application file for complete search history.

(56) References Cited

U.S. PATENT DOCUMENTS

| | | | | |
|---|---|---|---|---|
| 4,326,176 A * | 4/1982 | Aiki et al. | ................. | 372/45.01 |
| 4,378,951 A * | 4/1983 | Nagao | ............................. | 385/47 |
| 4,404,678 A * | 9/1983 | Aiki et al. | ................. | 372/45.01 |
| 4,482,779 A * | 11/1984 | Anderson | ..................... | 136/255 |
| 6,167,169 A * | 12/2000 | Brinkman et al. | ............... | 385/4 |
| 7,418,179 B2 * | 8/2008 | Estes et al. | .................... | 385/130 |
| 2004/0008943 A1 * | 1/2004 | Berini | ............................. | 385/39 |

* cited by examiner

*Primary Examiner* — Akm Enayet Ullah
(74) *Attorney, Agent, or Firm* — Occhiuti & Rohlicek LLP (57) ABSTRACT

Disclosed herein are a junction structure for wave propagation and a wave diode and a wave half-adder using the same. According to the present invention, the junction structure for wave propagation permits selective coupling of waves propagating through a junction plane between different wave propagation structures, whereby the wave junction structure, wave junction diodes and wave half-adders using waves including photons, surface plasmons, optomechanical phonons and their composite waves are realized to provide the same functions as those of electrical junction structures and application devices thereof.

8 Claims, 4 Drawing Sheets

JUNCTION STRUCTURE FOR WAVE PROPAGATION, WAVE DIODE AND WAVE HALF-ADDER USING THE SAME

CROSS-REFERENCE TO RELATED APPLICATIONS

The present application claims priority to Korean patent application number 10-2011-0062267, filed on Jun. 27, 2011 which is incorporated by reference in its entirety.

BACKGROUND

The present invention relates to a junction structure for wave propagation and a wave and a wave half-adder using the same, and more particularly, to a junction structure for wave propagation which permits selective coupling of waves propagating through a junction plane between different wave propagating structures, and a wave diode and a wave half-adder using the same.

Modern high speed optical communication is mainly based on time-reversal symmetry of Maxwell's equations and charge-less properties of photons, and optical materials and devices exhibit linearity resulting from such properties.

However, such linearity of optical materials and devices becomes a hindrance for an optical logic device or system requiring nonlinearity in application of the optical materials and devices. Thus, various challenges have been made to improve optical nonlinearity, which is a key factor of the logic device, in the optical device and material. For example, various optical nonlinear materials, methods of electromagnetic field focusing, nonlinear functional devices and signal processors, photonic-specific circuit design algorithms have been suggested to use merits of a photonic bandwidth such that all-optical signal processing can be achieved through.

However, despite such efforts having been made in the past, the challenges to obtaining successful integrated digital photonics or photo-tronics still remain in an initial stage and lead to dissatisfactory results. Given this circumstance, electronic engineering has been noticeably developed after introduction of junction structures merits consideration. The junction structure enables highly developed non-reciprocal and nonlinear operation with respect to flow of electric charges by joining structures or materials having different electric potentials so as to provide flexible, systematic and controllable potential energy manipulation to charge carriers passing through a junction plane. The essential applications of the junction structure include current electronic or spintronic devices, for example, diodes, transistors, high level logic processors, and the like.

In order to apply noticeable merits of the junction structure to the field of nano-optics, the wave nature of photons is considered worthy of notice. In particular, orthogonality between well-defined and sufficient eigenmodes of photons must be taken into account. For example, hetero-junction structures having various orthogonal modes can be configured to induce fundamental change in photon propagation through juxtaposition of two optical structures supporting different eigenmodes.

Although photons are mainly mentioned above, there is a need for a junction structure corresponding to an electrical junction structure for all waves including the photons and for a structure of propagating the waves.

The present invention is aimed at providing a junction structure for wave propagation which permits selective coupling of waves propagating through a junction plane between different wave propagation structures, and at providing a wave diode and a wave half-adder using the same.

SUMMARY

In accordance with one aspect of the present invention, a junction structure for wave propagation includes a first wave propagating structure configured to provide a first set of eigenmode waves orthogonal to each other and to have first eigen-energy levels carried thereby; a second wave propagating structure joined to the first wave propagating structure and configured to provide a second set of eigenmode waves orthogonal to each other and to have second eigen-energy levels carried thereby; and a means of energy level shift that shifts at least one of the first eigen-energy level and the second eigen-energy level to allow selective wave propagation between the first wave propagating structure and the second wave propagating structure through selective coupling of one wave of the first set of eigenmode waves to one wave of the second set of eigenmode waves.

Selective coupling between the one wave of the first set of eigen-mode waves and the one wave of the second set of eigen-mode waves may be performed based on similarity of wave mode functions thereof.

Selective coupling between the one wave of the first set of eigen-mode waves and the one wave of the second set of eigen-mode waves may be prevented based on orthogonality of wave mode functions thereof.

The means of energy level shift may be realized by bias applied from an outside or by an interior spontaneous nonlinearity induction means (structure).

The interior spontaneous nonlinearity induction means of the energy level shift means may have a resonant structure.

Each of the first and second wave propagating structures may include at least one structure selected from the group consisting of an atomic resonator/waveguide structure, a molecular resonator/waveguide structure, and a polarization resonator/waveguide structure.

In accordance with another aspect of the present invention, a wave diode further includes the wave propagating junction structure and a wave input/output unit with respect to the interior spontaneous nonlinearity induction means of the wave propagating junction structure.

In accordance with a further aspect of the present invention, a half-adder may include a first wave propagating structure configured to provide a first set of eigenmode waves orthogonal to each other and to have first eigen-energy levels carried thereby, the first wave propagating structure being provided with an interior spontaneous nonlinearity induction means; a second wave propagating structure joined to the first wave propagating structure, the second wave propagating structure being configured to provide a second set of eigenmode waves orthogonal to each other and to have second eigen-energy levels carried thereby; a third wave propagating structure joined only to the first wave propagating structure, the third wave propagating structure being configured to provide a third set of eigenmode waves orthogonal to each other and to have third eigen-energy levels carried thereby; and a means of potential energy shift and the interior spontaneous nonlinearity induction means within the first wave propagating structure allowing one wave of the first set of eigenmode waves to be coupled to one wave of the second set of eigenmode waves without being coupled to any of the third set of eigenmode waves when a wave input into the first wave propagating structure has a low input value, while allowing one wave of the first set of eigenmode waves to be coupled to one wave of the third set of eigenmode waves without being coupled to any of the second set of eigenmode waves through the shifting of energy of the first wave propagating structure when the wave input into the first wave propagating structure has a high input value.

According to the present invention, effective wave junction structures, junction diodes and half-adders using waves including photons, surface plasmons, optomechanical phonons and their composite are realized to provide the same functions as those of electrical junction structures and application devices thereof.

DESCRIPTION OF SPECIFIC EMBODIMENTS

Exemplary embodiments of the present invention will be described in more detail with reference to the accompanying drawings. However, it should be understood that the following embodiments are given by way of illustration only and that various transformations and alterations can be made without departing from the spirit and scope of the invention as defined by the appended claims and equivalents thereof.

Figure 1:
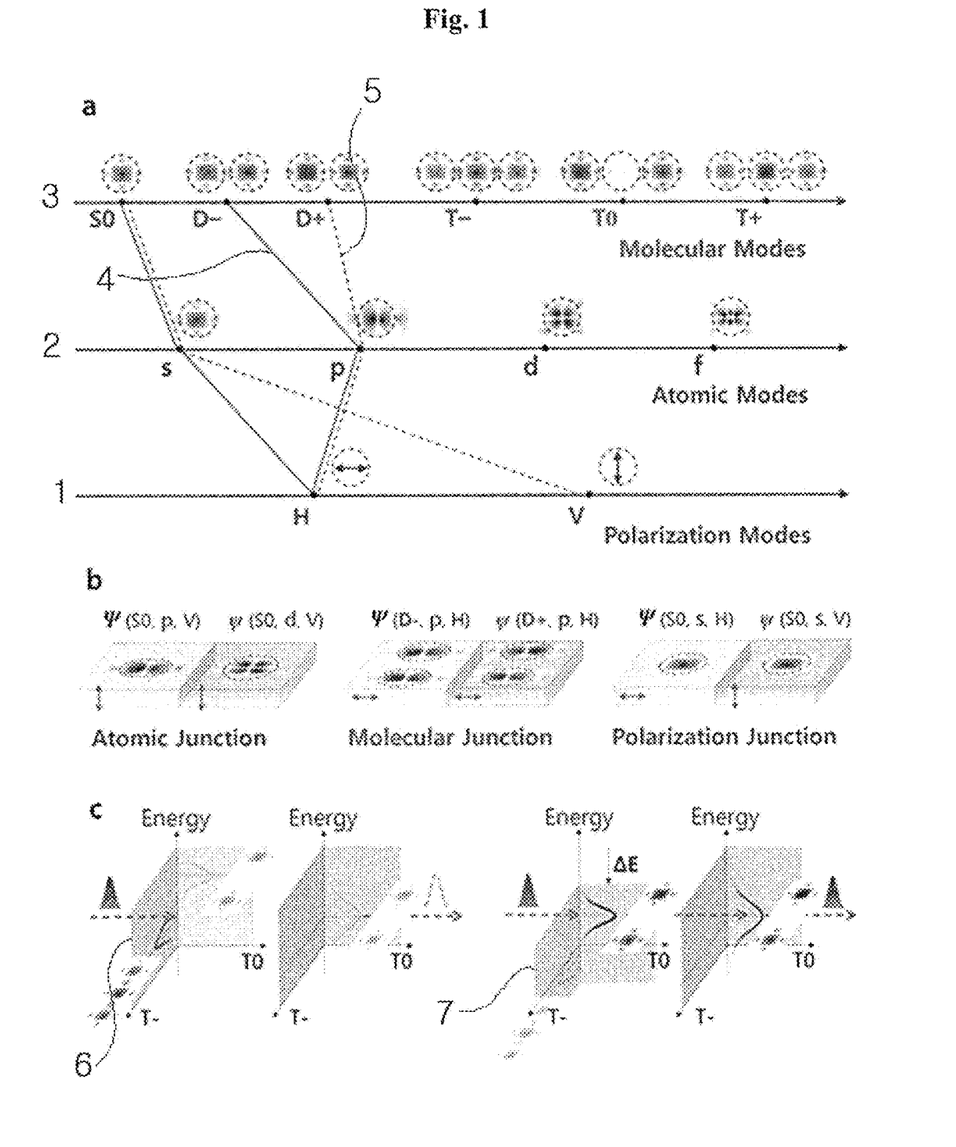
FIG. 1 shows diagrams of various examples of a junction structure in accordance with the present invention.

FIG. 1 shows diagrams of various examples of a junction structure in accordance with the present invention. More specifically, FIG. 1a shows a set of orthogonal modes expressed by combination of polarization modes (including horizontal and vertical components, represented by 1), atomic modes (including s, p, d and f components, represented by 2) and molecular modes (including mono-atomic, di-atomic and tri-atomic components, represented by 3). FIG. 1b shows that an orthogonal mode junction structure (with respect to the atomic, molecular and polarization modes) can be established between any two orthogonal modes having different eigenfrequencies and modal characteristics. Here, the two orthogonal modes are indicated by connecting lines in FIG. 1a. For example, in a di-atomic molecule consisting of dipole mode atoms sharing the same polarization (H), a molecular junction structure may be realized by a junction of two individual structures providing di-atomic molecule modes of even-paritiy (indicated by a solid line 4 in FIG. 1a) and odd-parity (indicated by a dotted line 5 in FIG. 1a) orthogonal to each other. In FIG. 1c, modes excited at an operating frequency are indicated by a solid line. By selectively adjusting the dielectric potential of a first wave propagating structure through methods of energy level shift, a dominant mode in a controlled domain may be switched, for example, between a non-shifted mode (T−, s: 6) and a ΔE-shifted potential (T0, s: 7) mode. The means of energy level shift as shown in FIG. 1c may be applied from outside or may be realized by a self-induced means. When spectral eigenmode profiles in left and right domains of the junction structure along the same modal axis (T− or T0) are multiplied, the output from the junction structure is obtained as "0" (6) or "1" (7). For clarity, orthogonal modes along the T+ axis are omitted in the drawing. When the dielectric potential is further adjusted to access the T+ state, multi-port and multi-valued operation of the junction structure is also possible. As shown in FIG. 1, according to the present invention, the junction structure for wave propagation includes first and second wave propagating structures, each of which is selected from among an atomic structure, a molecular structure and a polarization structure and consists of a junction therebetween. Each wave propagation structure is configured to provide a set of eigenmode waves orthogonal to each other and has eigen-energy levels carried thereby, and the eigen-energy levels of the wave propagation structures are varied by the means of energy level shift, which is realized by a bias applied from outside or by a self-induced means, thereby enabling selective wave propagation between the first wave propagating structure and the second wave propagating structure.

More specifically, using sufficient optical eigenmodes associated with independent physical parameters ($\sim N_a$, $N_m$, and $N_p$, each of which indicates the number of optical atomic, molecular or polarization modes), hetero-junction structures (for example, atomic, molecular and polarization junction structures) between various orthogonal modes as shown in FIG. 1a can be generated as in FIG. 1b, and the only difference therebetween is mode-overlap and frequency separation thereof. For example, considering the case of FIG. 1c which shows fundamental operation of $\psi i$-$j$-$\psi j$ supporting $T-(1, \sqrt{2}, 1)$ and $T_o (-\sqrt{2}, 0, \sqrt{2})$ molecular modes of tri-atoms. When the dielectric potential is adjusted with respect to a specific domain (for example, a right domain) of the junction structure in an external application manner or in a self-induced manner, a dominant eigenmode in the adjusted domain can be dynamically switched between $\psi i$ and $\psi j$. For example, the dominant eigenmode obstructs or authorizes ($<i/j>=\delta_{ij}$) penetration of a photon flow across the junction structure. (Hereinafter, a potential controlled domain will be denoted by $\Psi_{i,j}$, and the dominant eigenmode toggles between $\psi i$, which is a normal condition indicated by 6 in FIG. 1, and $\psi i$ which has a shifted dielectric potential indicated by 7 in FIG. 1).

Despite employing a simplistic principle, the concept of orthogonal mode junction suggested by the present invention provides a unique design for constructing a device that enables flexible, systematic and fundamental control with respect to wave propagation. By way of example, a photonic diode may be embodied using the junction structure.

As compared to an electrical diode which mainly acts to regulate the flow of electric current and has nonlinear and asymmetrical response characteristics, the photonic diode has received much attention as a photonic counterpart of the electrical diode. Nevertheless, since the photonic diode entails severe power consumption of about several W/μm in view of threshold power as proven by experiments and has a problem with limited throughput and directionality, the photonic diode is still a subject of scholastic curiosity and has difficulty in realization. However, the photonic junction structure of the present invention may permit realization of a photonic junction diode which exhibits high performance and operates at low power.

Figure 2:
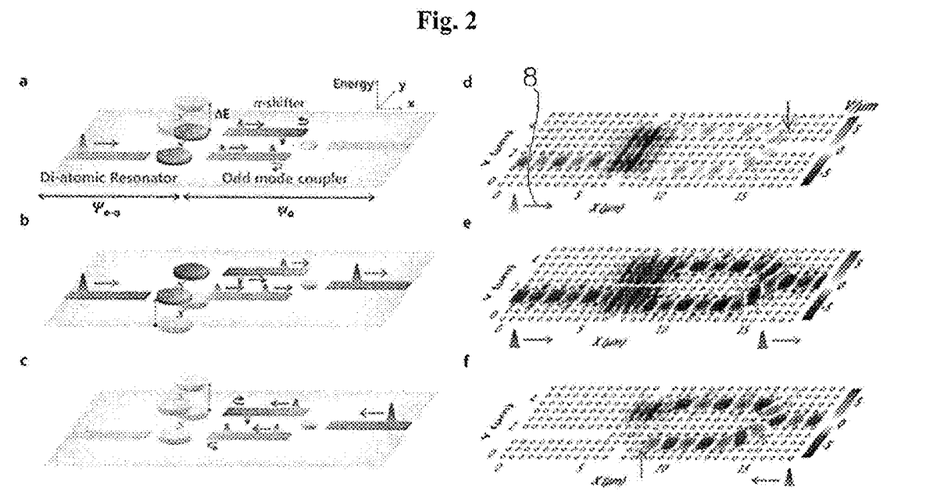
FIG. 2 is a view illustrating an operating principle of a photonic mode junction diode in accordance with one embodiment of the present invention.

FIG. 2 is a view illustrating an operating principle of a photonic mode junction diode in accordance with one embodiment of the present invention. FIG. 2a shows an energy state of the photonic diode upon application of forward bias at a threshold value or less, FIG. 2b shows an energy state of the photonic diode upon application of forward bias at a threshold value or more, and FIG. 2c shows an energy state of the photonic diode upon application of reverse bias. Field patterns within photonic crystals corresponding to FIGS. 2a, 2b and 2c are shown in FIGS. 2d, 2e, and 2f, respectively. Referring to FIGS. 2b and 2e, unidirectional signal propagation is clearly confirmed at a threshold value or more for diode operation, thereby proving operation as a diode. In other operating states, for example, when forward bias is applied thereto at a threshold value or more for diode operation as in FIGS. 2a and 2d, wave propagation is strictly prohibited in an odd-mode coupler, and when reverse bias is applied thereto as in FIGS. 2c and 2f, wave propagation is strictly prohibited in a boundary at a right end of a di-atomic resonator. The photonic mode junction diode according to this invention further includes a wave input/output unit with respect to the wave propagation junction structure, thereby enabling asymmetric operation thereof.

Next, the structure shown in FIG. 2 will be described in more detail. As shown in FIGS. 2a to 2c, as a unique feature without loss of generality, a di-atomic resonator providing even- and odd-orthogonal molecular modes divided into frequencies $\omega_e$ and $\omega_o$ can be considered.

The di-atomic resonator in $\Psi_e$ eigenmode at an operating frequency $\omega_e$ forms a $\Psi_e$-$\Psi_o$ mode junction when coupled to the $\Psi_o$ odd-mode coupler. (Such a $\Psi_o$ coupler may be composed of, for example, a 1×2 splitter and a π-phase shifter at one arm.) Due to the left-side di-atomic resonator of high Q factor containing high density photons and thus having further improved self-induced optical nonlinearity as compared with the right-side $\Psi_o$ coupler, the optical potential shift near the $\Psi_{e-o}$-$\psi_o$ junction depends more intensively on the direction of an incident wave, thereby realizing directionality critically required for diode operation. For reference, the di-atomic resonator or the $\psi_o$ coupler may be substituted by a single atomic resonator having a different type of orthogonal mode structure, for example, any two orthogonal atomic modes. Important results of the aforementioned structure are as follows.

First, in a linear regime under a threshold value for diode operation, wave propagation to the other side of the junction diode is completely suppressed by mode orthogonality expressed by $<\psi_e/\psi_o>=\delta_{e-o}$. In a nonlinear regime over a threshold value for diode operation under forward bias, the dominant mode $\Psi_{e-o}$ of the di-atomic resonator is shifted from $\psi_e$ to $\psi_o$ due to a strong field accumulated inside the resonator and dielectric potential shift ($n_2 I/n_o \sim (\omega_o - \omega_e)/\omega_e$) caused thereby, and has complete penetration with respect to the $\psi_o$ coupler domain ($<\psi_o/\psi_o>=1$), as shown in FIG. 2b. It should be noted that a low Q factor of a waveguide and thus negligible nonlinearity secure the mode of the coupler domain to the $\psi_o$ mode, and mode conversion and transmission with respect to reverse bias is suppressed ahead of the $\psi_e$, $\psi_o$ junction, which provides orthogonality between modes through the $\psi_o$ domain of the junction structure. The junction diode according to the present invention has a simple structure and provides more unique and superior advantages to previous conventional photonic diodes. First, as compared to the conventional diode which employs an asymmetrical barrier for directional operation of the diode (accordingly, resulting in severe impedance mismatching as indicated by $K_L \ll K_R$), the junction diode according to the present invention has a completely symmetrical potential barrier while ensuring desired directionality of the diode through asymmetric arrangement of the modal orthogonal structure. As a result, an impedance matched design can be realized without any damage, particularly, without any sacrifice of directionality or throughput. Furthermore, it is possible to successfully achieve a high reverse breakdown point (through mode orthogonality), very low threshold power (through feeding of on-resonance to the resonator in the $\psi_e$ mode, see FIG. 2a) and transmittance approaching about 100% (by on-resonance releasing from the resonator $\psi_o$ mode to the $\psi_o$ mode coupler, as shown in FIG. 2b) through an orthogonal 2-band resonance operation of the $\Psi_{e-o}$-$\psi_o$ junction (this is compared to off-resonance excitation of low efficiency inevitably occurring in a single band diode).

In order to realize and prove the present invention in practice, a two-dimensional square-lattice rod-type photonic crystal platform according to an exemplary embodiment was used. For comparing with a conventional technique, the present invention employs optical Kerr nonlinearity among various optical nonlinearities. With respect to three operating states of the diode as shown in FIGS. 2a to 2c, FIGS. 2d to 2f show the corresponding field patterns at an operating frequency $\omega_e$ of 193.24 THz (1551.4 nm) obtained by finite difference time domain (FDTD) analysis. In forward operation below a threshold voltage (see FIG. 2d), energy build-up corresponding to resonance $\psi_e$ mode excitation with respect to the di-atomic resonator $\Psi_{e-o}$ was observed. However, due to destructive interference in the $\psi_o$ coupler (indicated by arrow 8), wave transmission of the diode is completely blocked, as anticipated.

On the contrary, FIG. 2e shows operation of the diode above the threshold point. In this case, the di-atomic resonator mode changes from $\psi_e$ to $\psi_o$ due to resonate dielectric potential variation resulting from the optical Kerr effect, thereby enabling on-resonance constructive releasing to the $\psi_o$ mode coupler. Meanwhile, as shown in FIG. 2f, in reverse operation of waves entering a right end, since very small wave energy is supplied to the resonator due to orthogonality between the wave mode $\psi_o$ exiting the coupler and the di-atomic resonator mode $\psi_e$, exhibition of nonlinear optical Kerr-effects in the resonator and output to the left end of the diode are suppressed. Additionally, when a resonator having a higher Q factor is employed, it is possible to further reduce eigen-energy spectral overlap between the $\psi_e$ mode and the $\psi_o$ mode, whereby unwanted leakage into the resonator can be minimized and a high reverse breakdown point can be obtained.

Figure 3:
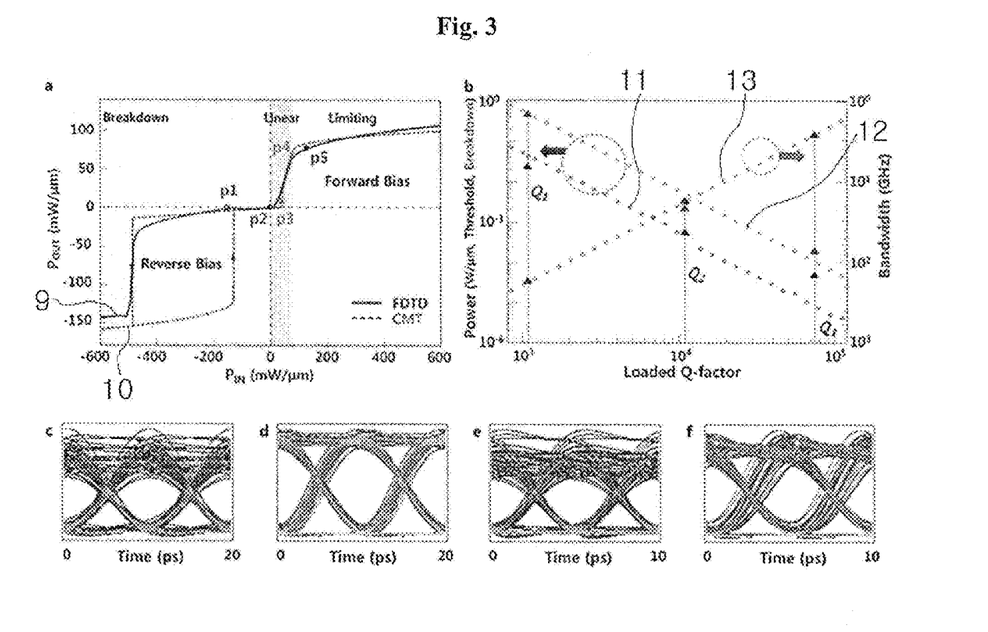
FIG. 3 shows operating characteristics of the photonic mode junction diode in accordance with the embodiment of the present invention.

In FIG. 3a, a line 9 is a response curve obtained by FDTD and expressed as a function of input power. Here, forward bias is expressed by + and reverse bias is expressed by −. A low threshold value of about 23 mW/μm and a high reverse breakdown value of about 481 mW/μm were observed, and thus it could be ascertained that a junction diode having ultra-low power and a high degree of uni-directionality was realized. It could be ascertained that maximum contrast and diode output efficiency were 41 dB (at 142.2 mW/μm, 15.7 dB in view of maximum output efficiency) and 0.96 (at 64.1 mW/μm). That is, FIG. 3a shows a response curve of the $\Psi_{e-o}$-$\psi_o$ junction diode, in which "9" is numerically obtained by FDTD and "10" is analytically obtained by temporary coupled mode theory (CMT). FIG. 3b shows diode operation threshold optical power (circle 11), breakdown optical power (circle 12) and operating bandwidth (circle 13) with respect to loaded Q factors of the di-atomic resonator as calculated by the CMT. Triangles on the CMT plot are results of FDTD numerical analysis assuming the square-lattice photonic crystal platform. In FDTD analysis, the examples of junction diode with different loaded quality factors (Q1=1094, Q2=10945, Q3=74895) were realized to measure the characteristics using the same by adjusting the number of dielectric rods around the resonator.

For reference, when using a resonator having a high Q factor in realization of the diode, power consumption can be lowered in view of two aspects. First, nonlinearity is enhanced by concentration of fields within the resonator. More importantly, when using the feature of the resonator bandwidth narrowing with increasing Q factor, it is possible to reduce difference in frequency between two orthogonal modes, i.e. operating energy. For example, in order to reduce difference in frequency between the di-atomic resonator modes (even-mode $\psi_o$ and odd-mode $\psi_e$), a method of reducing coupling intensity between the two resonators may be used.

Diode operation at a ultra-low power ranging from 4.22 µW/µm to 73 mW/µm is anticipated at a suitable operating speed of 1.74 GHz to 227 GHz, and the operating power may be further lowered below several µW range when using a material having a higher Kerr index, employing a resonator of a significantly low modal volume, or increasing spectral mode overlap across the junction.

As one example of the photonic diode, performance of a passive all-optical regenerator using a saturation domain of the junction diode for application to high quality ultra-high speed signal processing will be described. FIGS. 3(d) and 3(f) show optical eye patterns regenerated according to outputs of the junction diode with respect to input signals of 100 Gbit/s (c) and 200 Gbit/s (e), respectively. This result was obtained using highly saturated domains in characteristic curves (p2-p3-p4-p5. FIG. 3a) with respect to $2^7$-1 PRBS (Pseudo-Random Bit Sequence) NRZ (Non-Return-to-Zero) input signals. The input signals generated in FDTD analysis include amplitude noise (noise according to Gaussian random distribution providing amplitude distortion with respect to Level 0 between point p2 and point p3 and amplitude distortion with respect to Level 1 between point p4 and point p5). Optical Butterworth filters were employed to identify signal bandwidths with respect to output signals from a generator. Significant quality improvement was observed with respect to the signals passing through the all-optical manual regenerator. The improvement could be seen from an output signal quality factor Q°s of 13.5 (Q°s=7.0), which was significantly improved as compared with an input signal quality factor Q$^i$s of 3.3 (Q$^i$s=3.9) at 100 Gbit/s (200 Gbit/s).

Figure 4:
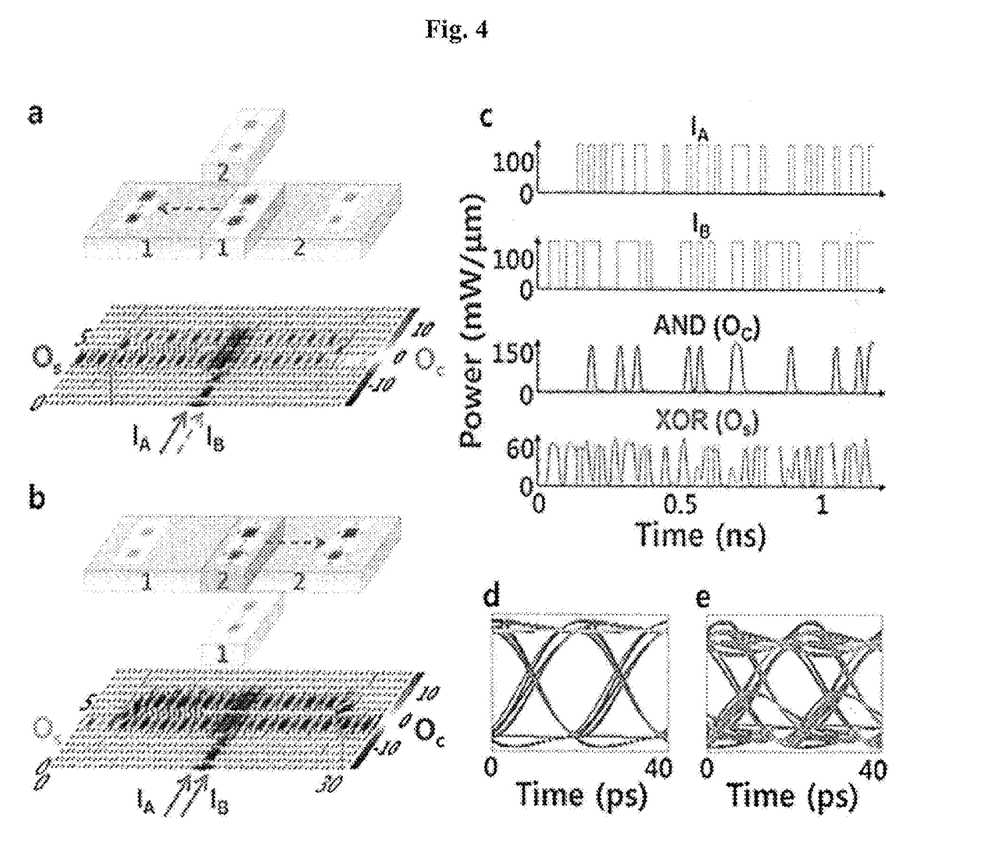
FIG. 4 is a view of a monolithic multi-junction photonic half-adder in accordance with another embodiment of the present invention.

As the ultra-low power high speed photonic diode can be realized using the simplest $\Psi_{e-o}$-$\psi_o$ junction, other examples for systematic application of the mode junction concept can be considered. A half-adder is a main constitutional block for an ALU (Arithmetic Logic Unit) in a CPU (Central Processing Unit), and has been frequently considered for application in the field of photonics. However, current half-adders are generally embodied in the form of a combination of discrete devices and have a problem of insufficient input-output isolation. To solve such a problem, the present invention is applied to a monolithic, multi-junction half-adder ($\psi_e$-$\Psi_{e-o}$-$\psi_o$, see FIG. 4a). In this structure, a nonlinear domain $\Psi_{e-o}$ having a high Q factor is sandwiched between the $\psi_e$ structure and the $\psi_o$ structure. Here, the $\psi_e$ structure and the $\psi_o$ structure mean the even-mode coupler and the odd-mode coupler, respectively. In this structure, when input power of a logic signal $I_A$ or $I_B$ to the $\Psi_{e-o}$ resonator is set to be slightly lower than a threshold value for modal conversion, the central resonator is in the $\psi_e$ state upon application of a single input source and thus an XOR terminal ($O_S$; it supports $\psi_e$) becomes an output terminal (in FIG. 4a, $\psi_e$-$\Psi_e$→1, $\Psi_e$-$\psi_o$→0). Meanwhile, when the sum of powers for two input signals ($I_A \cdot I_B$) becomes greater than the threshold value, the transformed resonator mode $\psi_o$ is output to an $O_c$ terminal due to nonlinearity in the central resonator, thereby activating AND operation (in FIG. 4b, $\psi_e$-$\Psi_o$→0, $\Psi_o$-$\psi_o$→1). FIG. 4 shows a monolithic half adder having a multi-junction structure, in which FIG. 4a shows output of a single logic input ($I_A$ or $I_B$) power through S (XOR) terminal below a threshold value and FIG. 4b shows output of two input signals ($I_A \cdot I_B$) through C (AND) terminal at a threshold value or more. Excitation of even-mode (state 1) or odd-mode (state 2) with respect to the central di-atomic resonator and propagation towards the even-mode/odd-mode coupler at the S/C terminals (left/right) of the half-adder can be clearly seen from a field amplitude plot. FIG. 4c shows AND & XOR logic operation in response to two input signals at 50 Gbps. FIGS. 4d and 4e shows optical eye patterns of AND & XOR outputs. Additionally, when a three-level $\psi_2$-$\Psi_{(1/2/3)}$-$\psi_3$ structure based on three modes of a tri-atomic molecule state (see T0, T− and T+ of FIG. 1) is used, it is possible to achieve complete separation between input and output, thereby preventing interference between devices.

As examples of the photonic junction diode and the monolithic multi-junction half-adder, square-lattice, rod-type photonic crystals were used. For a lattice parameter of a=573 nm, the diameter of the dielectric rod was set to 0.2a, the index of linear refraction (n) and the index of nonlinear refraction were assumed to 3.5 and $1.5 \times 10^{-17}$ m$^2$/W, respectively, in consideration of a typical Kerr medium. Other types of self-induced nonlinearity such as two-photon absorption or nonlinear optical activity may also be equally applied. The major axis and minor axis of an elliptical rod constituting the di-atomic resonator were set to 0.64a and 0.54a in order to induce two-band resonance while providing ignorable spectral mode overlap ($\psi_e/\psi_o$=0.16) at 193.24 THz (1551.4 nm, $\psi_e$) and 193.55 THz (1548.9 nm, $\psi_o$). Considering both device speed and power consumption, the loaded Q factor and modal volume V of the di-atomic resonator were set to 1094 and 0.19 µm$^2$ for design of electric current. For design of phase shift in the $\psi_e$ or $\psi_o$ coupler used for the junction diode and the multi-function half-adder, some dielectric rods were moved 30, 60, 90 and 120 nm in an adiabatic manner from sides of the photonic crystal waveguide towards an inner/outer sides.

[Analysis of Frequency Domain of Photonic Junction Diode]

Figure 5:
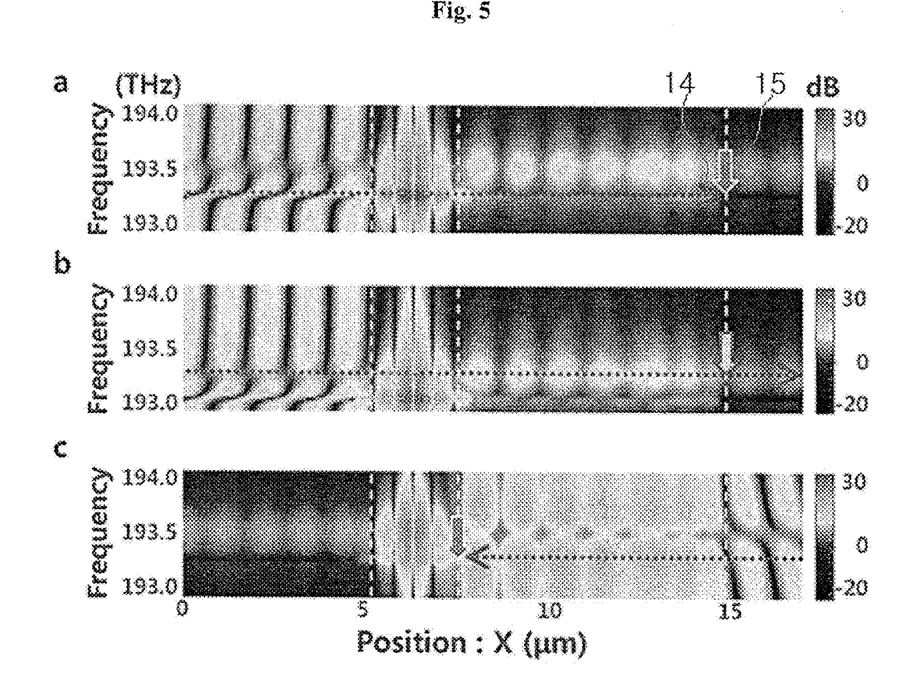
FIG. 5 is a view illustrating frequency domain analysis with respect to a photonic junction diode in accordance with the present invention.

Frequency domain analysis was performed based on a finite element method using COMSOL Multiphysics software. FIG. 5 is a view illustrating frequency domain analysis with respect to a photonic junction diode in accordance with the present invention. FIG. 5 shows field intensity at each point on the x-axis of a propagation direction (integrated on a y-axis plane) as calculated with respect to incident waves having different frequencies. In FIG. 5, the x-axis indicates spatial positions, the y-axis indicates excitation signal frequencies, and the field intensities of the mode junction diodes calculated by FEM are expressed by log scale colors. As can be seen from this figure, two orthogonal modes $\psi_e$ and $\psi_o$ coexist at different frequencies $\omega_e$ and $\omega_o$ within the di-atomic resonator. As shown in FIG. 5a, under forward bias of a threshold value or less, strong energy build-up to the $\psi_e$ mode in the $\Psi_{e-o}$ resonator was observed at an operating frequency $\omega_e$ (indicated by a dotted-line arrow 14). Nevertheless, wave propagation to the opposite side of the diode is prevented by the $\psi_o$ mode coupler (indicated by a thick-line arrow 15), which is mode orthogonal. As shown in FIG. 5b, under forward bias of a threshold voltage or more (refractive index shift of 0.157% or more), frequency down-shifted $\psi_o$ resonator mode is coupled to the $\psi_o$ mode coupler. As shown in FIG. 5c, under reverse bias, significantly weak excitation with respect to the $\psi_o$ resonator mode was observed due to mode orthogonality, so that wave propagation to the opposite end of the diode is prevented. FIG. 5 illustrates operation of the diode according to the present invention in the frequency domains and complements for time domain FDTD and CMT analysis.

[CMT Analysis with Respect to Photonic Junction Diode]

Figure 6:
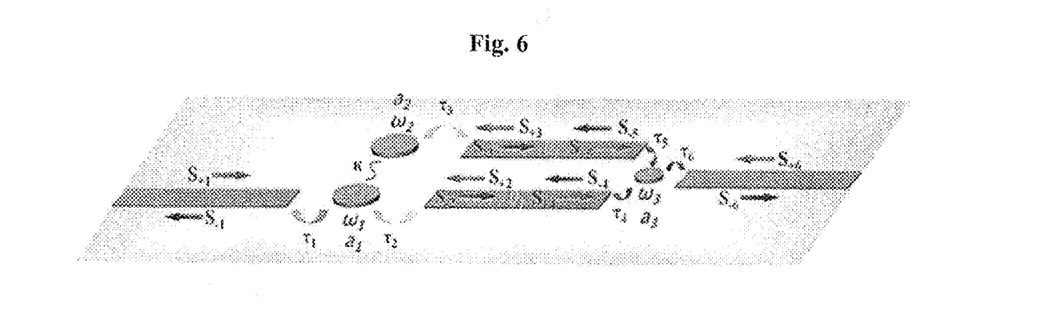
FIG. 6 is a view illustrating CMT (Coupled Mode Theory) used for analysis of the photonic junction diode in accordance with the present invention.

FIG. 6 is a view illustrating CMT (Coupled Mode Theory) used for analysis of the photonic junction diode in accordance with the present invention. Coupled modes may be expressed by the following equations:

$$\frac{d}{dt}\begin{pmatrix} a_1 \\ a_2 \\ a_3 \end{pmatrix} = \begin{pmatrix} -i\omega_1 - \left(\frac{1}{\tau_1} + \frac{1}{\tau_2}\right) & i\kappa_{12} & 0 \\ i\kappa_{21} & -i\omega_2 - \frac{1}{\tau_3} & 0 \\ 0 & 0 & -i\omega_3 - \left(\frac{1}{\tau_4} + \frac{1}{\tau_5} + \frac{1}{\tau_6}\right) \end{pmatrix}\begin{pmatrix} a_1 \\ a_2 \\ a_3 \end{pmatrix} + \begin{pmatrix} \sqrt{\frac{2}{\tau_1}}S_{+1} + \sqrt{\frac{2}{\tau_2}}S_{+2} \\ \sqrt{\frac{2}{\tau_3}}S_{+3} \\ \sqrt{\frac{2}{\tau_4}}S_{+4} + \sqrt{\frac{2}{\tau_5}}S_{+5} + \sqrt{\frac{2}{\tau_6}}S_{+6} \end{pmatrix} \quad (1)$$

$$S_{-1} = -S_{+1} + \sqrt{\frac{2}{\tau_1}} a_1 \quad (2)$$

$$S_{-2} = -S_{+2} + \sqrt{\frac{2}{\tau_2}} a_1 \quad (3)$$

$$S_{-3} = -S_{+3} + \sqrt{\frac{2}{\tau_3}} a_2 \quad (4)$$

$$S_{-4} = -S_{+4} + \sqrt{\frac{2}{\tau_4}} a_3 \quad (5)$$

$$S_{-5} = -S_{+5} + \sqrt{\frac{2}{\tau_5}} a_3 \quad (6)$$

$$S_{-6} = -S_{+6} + \sqrt{\frac{2}{\tau_6}} a_3 \quad (7)$$

$$S_{+2} = S_{-4} e^{j\theta_1} \quad (8)$$

$$S_{+3} = S_{-5} e^{j\theta_2} \quad (9)$$

$$S_{+4} = S_{-2} e^{j\theta_1} \quad (10)$$

$$S_{+5} = S_{-3} e^{j\theta_2} \quad (11)$$

By substituting Equations 3 to 6 into Equations 8 to 11, wave components entering the resonators 1, 2 and 3 may be expressed by the following equations.

$$S_{+2} = \frac{\sqrt{\frac{2}{\tau_2}} e^{j\theta_1}}{2i\sin\theta_i} a_1 + \frac{-\sqrt{\frac{2}{\tau_4}}}{2i\sin\theta_i} a_3 \equiv \alpha_{21} a_1 + \alpha_{23} a_3 \quad (12)$$

$$S_{+3} = \frac{\sqrt{\frac{2}{\tau_3}} e^{j\theta_2}}{2i\sin\theta_2} a_2 + \frac{-\sqrt{\frac{2}{\tau_5}}}{2i\sin\theta_2} a_3 \equiv \alpha_{32} a_2 + \alpha_{33} + a_3 \quad (13)$$

$$S_{+4} = \frac{-\sqrt{\frac{2}{\tau_2}}}{2i\sin\theta_1} a_1 + \frac{\sqrt{\frac{2}{\tau_4}} e^{j\theta_1}}{2i\sin\theta_1} a_3 \equiv \alpha_{41} a_1 + \alpha_{43} a_3 \quad (14)$$

$$S_{+5} = \frac{-\sqrt{\frac{2}{\tau_3}}}{2i\sin\theta_2} a_2 + \frac{\sqrt{\frac{2}{\tau_5}} e^{j\theta_2}}{2i\sin\theta_2} a_3 \equiv \alpha_{52} a_2 + \alpha_{53} a_3 \quad (15)$$

When substituting Equations 12 to 15 into Equation 1, field amplitudes $a_1$, $a_2$, and $a_3$ in the resonators may be obtained as follows.

$$a_1 = \frac{-\left(c_5 - \frac{c_6 M_2}{c_3}\right)\sqrt{\frac{2}{\tau_1}} S_{+1} + \left(c_{12} - \frac{c_2 M_2}{c_3}\right)\sqrt{\frac{2}{\tau_6}} S_{+6}}{\left(M_1 - \frac{c_{21} c_2}{c_3}\right)\left(c_5 - \frac{c_6 M_2}{c_3}\right) - \left(c_4 - \frac{c_6 c_{21}}{c_3}\right)\left(c_{12} - \frac{c_2 M_2}{c_3}\right)} \quad (16)$$

$$a_2 = \frac{-\left(c_4 - \frac{c_6 c_{21}}{c_3}\right)\sqrt{\frac{2}{\tau_1}} S_{+1} + \left(M_1 - \frac{c_{21} c_2}{c_3}\right)\sqrt{\frac{2}{\tau_6}} S_{+6}}{\left(M_1 - \frac{c_{21} c_2}{c_3}\right)\left(c_5 - \frac{c_6 M_2}{c_3}\right) - \left(c_4 - \frac{c_6 c_{21}}{c_3}\right)\left(c_{12} - \frac{c_2 M_2}{c_3}\right)} \quad (17)$$

$$a_3 = \frac{c_4 M_2 - c_{21} c_5}{c_3 c_5 - c_6 M_2}. \quad (18)$$

$$\frac{-\left(c_5 - \frac{c_6 M_2}{c_3}\right)\sqrt{\frac{2}{\tau_1}} S_{+1} + \left(c_{12} - \frac{c_2 M_2}{c_3}\right)\sqrt{\frac{2}{\tau_6}} S_{+6}}{\left(M_1 - \frac{c_{21} c_2}{c_3}\right)\left(c_5 - \frac{c_6 M_2}{c_3}\right) - \left(c_4 - \frac{c_6 c_{21}}{c_3}\right)\left(c_{12} - \frac{c_2 M_2}{c_3}\right)}$$

Where $$M_1 = i(\omega - \omega_1) - \left(\frac{1}{\tau_1} + \frac{1}{\tau_2}\right) + \sqrt{\frac{2}{\tau_2}} \alpha_{21} \quad (19)$$

$$M_2 = i(\omega - \omega_2) - \frac{1}{\tau_3} + \sqrt{\frac{2}{\tau_3}} \alpha_{32}, \text{ and} \quad (20)$$

$c_{ij}$ are constants not influenced by nonlinear frequency shift and satisfy the followings.

$c_{12}=ik_{12}, c_{21}=ik_{21}, c_2=(2/\tau_2)^{1/2}\alpha_{23}, c_3=(2/\tau_3)^{1/2}\alpha_{33}, c_4=(2/\tau_4)^{1/2}\alpha_{41}, c_5=(2/\tau_5)^{1/2}\alpha_{52}$, and $c_6=i(\omega-\omega_3)-(1/\tau_4+1/\tau_5+1/\tau_6)+(2/\tau_4)^{1/2}\alpha_{43}+(2/\tau_5)^{1/2}\alpha_{53}$.

To calculate field energy ($|\alpha_1|^2$ and $|\alpha_2|^2$) resonators from Equations 16 and 18, resonance frequency red-shift caused by Kerr nonlinearity is determined with respect to the resonator 1 and 2 using Equation $\omega_k=\omega_k^0-\rho|\alpha_k|^2$ (k=1, 2). Here $\omega_k^0$ is a resonator frequency without nonlinearity, $\rho$ is $\sigma\omega_k^0(n_2/n_0)\cdot(c/n_0 V_{kerr})$. $\sigma$ is the ratio of mode energy stored in the nonlinear modified domain, c is the velocity of light, $V_{kerr}$ is the modal volume of the nonlinear resonator, and n2 is the coefficient of Kerr.

Under conditions of forward and reverse bias, transmitted optical power may be calculated from Equations 16 and 18 using $P_o/(2/\tau_6)|\alpha_3|^2$ with respect to forward input boundary conditions, $|S_{+1}|^2=P_I$, $S_{+6}=0$, and $P_o=(2/\tau_1)|\alpha_1|^2$ with respect to reverse input boundary conditions, $|S_{+6}|^2=P_I$, $S_{+1}=0$.

Particularly, in the boundary condition of forward bias, the field energy $|\alpha_3|^2$ stored in the resonator 3 may be obtained by the following equation.

$$|a_3|^2 = \frac{|c_1c_5 - c_4M_2|^2}{|c_3c_5 - c_6M_2|^2}|a_1|^2 \quad (21)$$

In Equation (21), $M_1(|\alpha_1|^2)$ and $M_2(|\alpha_2|^2)$ may be calculated from Equations 19 and 20 using a resonance shifted frequency of $\omega_k=\omega_k^0-\rho|\alpha_k|^2$, and $|\alpha_1|^2$ and $|\alpha_2|^2$ satisfy the following equation.

$$|a_1|^2 = \frac{\left|c_5 - \frac{c_6M_2}{c_3}\right|^2 \frac{2}{\tau_1}P_I}{\left|\left(M_1 - \frac{c_{21}c_2}{c_3}\right)\left(c_5 - \frac{c_6M_2}{c_3}\right) - \left(c_4 - \frac{c_6c_{21}}{c_3}\right)\left(c_{12} - \frac{c_2M_2}{c_3}\right)\right|^2} \quad (22)$$

$$\frac{|a_2|^2}{|a_1|^2} = \frac{|c_3c_4 - c_6c_{21}|^2}{|c_3c_5 - c_6M_2|^2} \quad (23)$$

In the boundary condition of reverse bias, the field energy $|\alpha_1|^2$ stored in the resonator 1 may be expressed by the following equation.

$$|a_1|^2 = \frac{\left|c_{12} - \frac{c_2M_2}{c_3}\right|^2 \frac{2}{\tau_6}P_I}{\left|\left(M_1 - \frac{c_{21}c_2}{c_3}\right)\left(c_5 - \frac{c_6M_2}{c_3}\right) - \left(c_4 - \frac{c_6c_{21}}{c_3}\right)\left(c_{12} - \frac{c_2M_2}{c_3}\right)\right|^2} \quad (24)$$

Here, when $\omega_k=\omega_k^0-\rho|\alpha_k|^2$, $M_1(|\alpha_1|^2)$ and $M_2(|\alpha_2|^2)$ may be calculated by the following equation, $$\frac{|a_2|^2}{|a_1|^2} = \frac{|c_3M_1 - c_2c_{21}|^2}{|c_3c_{12} - c_2M_2|^2} \quad (25)$$

Finally, the output power is obtained by $P_o=(2/\tau_6)|\alpha_3|^2$ for the forward input, and by $P_o=(2/\tau_1)|\alpha_1|^2$ for the reverse input. When using resonator parameter sets $\omega_k^0$, $\rho$, $\tau_j$ and $\theta_j$ measured by FDTD, transmission power and response curves of the diode are obtained as in FIG. 3a.

As can be seen from the above description, the present invention suggests the concept of a mode junction structure with respect to waves and provides embodiments of photo-tronics applications. The sufficient and well-defined orthogonal modes providing a sufficient degree of freedom in selection of the junction structure enable modular construction of highly nonlinear devices, which permit flexible and systematic overall control of the wave propagation. When specifically controlling the dielectric potential, dynamic and symmetrically destructive operation of the junction structure is easily induced. The present invention suggests an ultra-low photonic diode based on the $\Psi_{e-o}$-$\psi_o$ junction with respect to the simplest application, that is, the mode junction within the photonic crystal platform, thereby proving that high-speed all-optical signal regeneration through the ultra-low photonic diode is possible. Further, when compared to conventional photonic diodes, the present invention realizes excellent performance by several orders. Further, the present invention is applied to the $\psi_e$-$\Psi_{e-o}$-$\psi_o$ multi-junction based photonic half-adder, which provides AND and XOR outputs in an all-optical manner through the monolithic structure. The embodiments of the present invention are operated in a passive mode without external control and provide highly nonlinear characteristics having an ultra-low threshold value. Here, it should be understood that the concept of the present invention can be applied to other application devices. Notably, since the mode junction concept suggested by the present invention does not depend on an executable platform, the present invention is not limited to photons in the photonic crystals. Accordingly, the mode junction structure according to the present invention may be broadly applied to other fields related to wave propagation under different physical reality and environments. Such waves may include plasmons, opto-mechanical phonons, electronic quantum wave and hybrids thereof. In this case, as an external potential control means or a self-induced potential control means, micro-rings, plasmonic structures, electron wave structures, chiral structures or opto-mechanical resonators may be used.

What is claimed is:

1. A junction structure for wave propagation comprising:
 a first wave propagating structure configured to provide a first set of eigenmode waves orthogonal to each other and to have first eigen-energy levels carried thereby;
 a second wave propagating structure joined to the first wave propagating structure, the second wave propagating structure being configured to provide a second set of eigenmode waves orthogonal to each other and to have second eigen-energy levels carried thereby; and
 a means of energy level shift that shifts at least one of the first and second eigen-energy levels to allow selective wave propagation between the first wave propagating structure and the second wave propagating structure through selective coupling of one wave of the first set of eigenmode waves to one wave of the second set of eigenmode waves.

2. The junction structure for wave propagation according to claim 1, wherein selective coupling between the one wave of the first set of eigenmode waves and the one wave of the second set of eigenmode waves is performed based on similarity of wave mode functions thereof.

3. The junction structure for wave propagation according to claim 1, wherein selective coupling between the one wave of the first set of eigenmode waves and the one wave of the second set of eigenmode waves is prevented based on orthogonality of wave mode functions thereof.

4. The junction structure for wave propagation according to claim 1, wherein the means of energy level shift is realized by bias applied from an outside or by an interior spontaneous nonlinearity induction means.

5. The junction structure for wave propagation according to claim 1, wherein the interior spontaneous nonlinearity induction means of the energy level shift has a resonant structure.

6. The junction structure for wave propagation according to claim 1, wherein each of the first and second wave propagation structures comprises at least one structure selected from the group including an atomic resonator/waveguide structure, a molecular resonator/waveguide structure, and a polarization resonator/waveguide structure.

7. The junction structure for wave propagation according to claim 1, further comprising: a wave input/output unit with respect to the wave propagation junction structure to operate asymmetrically.

8. A wave diode comprising: the junction structure for wave propagation according to claim 1; and a wave input/output unit with respect to the wave propagation junction structure to operate asymmetrically, wherein the junction structure for wave propagation comprises an interior spontaneous nonlinearity induction means as the means of energy level shift.

* * * * *